United States Patent [19]

Kamisaka et al.

[11] Patent Number: 4,843,352
[45] Date of Patent: Jun. 27, 1989

[54] MODULATOR FOR GENERATING A BURST-LIKE MODULATED WAVE

[75] Inventors: Tadayuki Kamisaka; Kazuo Yagi; Yasufumi Takahashi, all of Yokohama; Shigeki Nakamura, Kawasaki, all of Japan

[73] Assignee: Hitachi, Ltd., Tokyo, Japan

[21] Appl. No.: 179,303

[22] Filed: Apr. 8, 1988

[30] Foreign Application Priority Data

Apr. 9, 1987 [JP] Japan ................................. 62-85696

[51] Int. Cl.⁴ .......................................... H04L 27/20
[52] U.S. Cl. .................................. 332/22; 332/23 R; 375/57; 375/60; 375/67
[58] Field of Search ............... 332/16 R, 19, 21, 23 R, 332/22; 375/52, 53, 56, 67, 57, 58, 60

[56] References Cited

U.S. PATENT DOCUMENTS

| 4,485,478 | 11/1984 | Takada | 375/60 |
| 4,706,262 | 11/1987 | Ohta | 375/60 |
| 4,756,008 | 7/1988 | Yagi et al. | 332/16 R X |

FOREIGN PATENT DOCUMENTS 634981  5/1983  Japan .

OTHER PUBLICATIONS

Barert et al, "A QPSK Modem Designed for 120 Mb/s TDMA Transmissions with a 70 MHz Intermediate Frequency", Fourth International Conference on Digital Satellite Communications, Oct. 23-25, 1978, Montreal, Canada, p. 139, IEEE Catalog No. 78CH1326-8.
"An Approach for the Design of a TDMA Burst Modem Operating in a Highly Nonlinear Satellite Channel", p. 102.
Feher, *Digital Communications Satellite/Earth Station Engineering* Prentice-Hall Inc., N.J., 1981, pp. 367-369.
Boutin et al, "Analysis and Design of a ROM Synthesizer as an Optimum Digital Transmit Filter", pp. 87-90 Intelsat/Tece/TIE Third International Conference on Digital Satellite Communications, Nov. 11-13, 1975, Kyoto, Japan.
Takahashi et al, "Experimental System for Computer Network VIA Satellite" *Review of the Radio Research Laboratories* vol. 28, No. 145, Mar. 1982, pp. 31-38.

*Primary Examiner*—Siegfried H. Grimm
*Attorney, Agent, or Firm*—Antonelli, Terry & Wands

[57] ABSTRACT

A modulator for generating a burst-like modulated wave used in a multi-carrier transmission type communication system in which a plurality of modulated waves including at least one burst-like modulated wave exist on the same transmission line and the frequency band occupied by energy of each of the plurality of modulated waves is limited. Polarities of the transmission code which appear before and after either of on-timing and off-timing of the carrier on/off switched to obtain the burst-like modulated wave among the plurality of modulated waves are inverted to each other, whereby the envelope of the burst-like modulated wve can be changed gradually at the carrier on/off timing in order to reduce the interference of the modulated wave with the adjacent channels without degrading the transmission efficiency.

5 Claims, 14 Drawing Sheets

ADJACENT CHANNELS

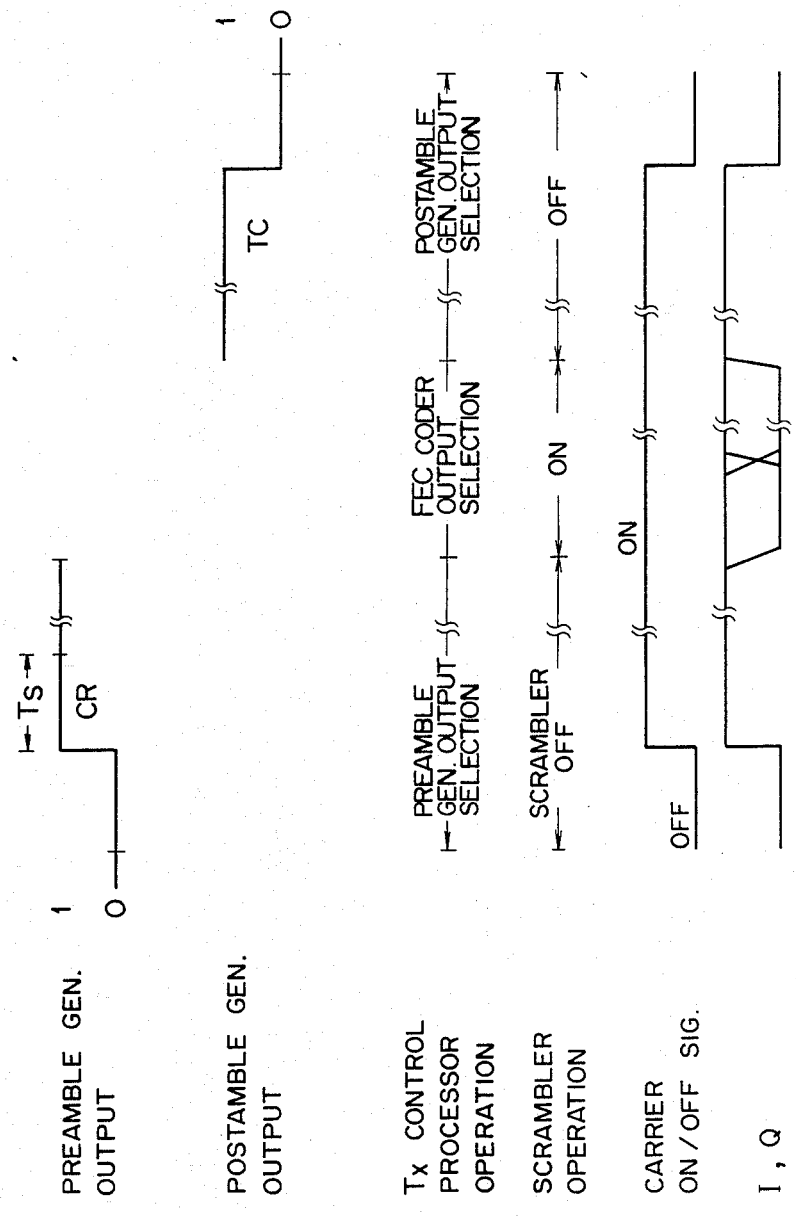

MODULATOR FOR GENERATING A BURST-LIKE MODULATED WAVE

CROSS-REFERENCE TO RELATED APPLICATIONS

This application is related to U.S. patent application Ser. No. 173,652, entitled "Carrier Recovery Phase-Locked Loop" claiming a priority based on Japanese patent application No. 62-68060 filed Mar. 24, 1987 by Shigeki Nakamura and Yasufumi Takahashi and filed Mar. 24, 1988.

BACKGROUND OF THE INVENTION

This invention relates to modulators for use in a multi-carrier/time division multiple access system applicable to digital satellite communications and the like and more particularly to this type of modulator which can suppress the spread of a modulated wave spectrum during on/off switching of a carrier. In the multicarrier/time division multiple access system, a plurality of burst-like carriers are transmitted through a transmission line which is either a wire transmission line or a radio transmission line.

Conventionally, a modulator for use in the quadrature phase shift keying (QPSK) modulation/time division multiple access (TDMA) system has been known as shown in FIG. 1 on page 139 of Fourth International Conference on Digital Satellite Communications, Oct. 23-25, 1978, MONTREAL, CANADA, IEEE Catalog No. 78CH1326-8 entitled "A QPSK MODEM DESIGNED FOR 120 Mb/s TDMA TRANSMISSIONS WITH A 70 MHz INTERMEDIATE FREQUENCY". Also, a frame format of a burst-like signal is illustrated in FIG. 5 on page 102 of an article in the same literature entitled "AN APPROACH FOR THE DESIGN OF A TDMA BURST MODEM OPERATING IN A HIGHLY NONLINEAR SATELLITE CHANNEL".

The configuration of the known modulator and the known frame format of the burst-like modulated wave are illustrated herein in FIGS. 1 and 2, respectively. Referring now more particularly to FIG. 1, a frame formatting circuit 1 for the burst-like modulated wave responds to a binary I (channel) data signal 20, a binary Q (channel) data signal 22 and a timing signal 21 to produce a binary I bit pattern 23 and a binary Q bit pattern 24. The binary I bit pattern 23 and binary Q bit pattern 24 have each the form of a unipolar signal and are respectively converted by NRZ (Non Return to Zero) waveform conversion circuits 2 and 3 into bipolar NRZ waveform signals of ±1 polarities or senses. NRZ I bit stream 25 and NRZ Q bit stream 26 respectively delivered out of the NRZ waveform conversion circuits 2 and 3 are passed through band limit filters 4 and 5 so as to be converted into an I base band waveform signal 27 and a Q base band waveform signal 28 which are supplied to double balanced mixers 6 and 7. A carrier 36 generated from an oscillator 10 is applied to a phase shifter 12 which responds to the carrier 36 to provide carriers 29 and 30 of different phases. These carriers 29 and 30 are $\pi/2$ out of phase relative to each other and applied to the double balanced mixers 6 and 7, respectively. The mixers 6 and 7 then respectively deliver out an I binary phase shift keying (BPSK) modulated wave 31 and a Q BPSK modulated wave 32. The modulated waves 31 and 32 respectively correspond to the carriers 29 and 30 which are in their original phases when the output signals from the NRZ waveform conversion circuits 2 and 3 are of +1 polarity but they respectively correspond to the carriers 29 and 30 which are 180° phase shifted relative to their original phases when the output signals from the NRZ waveform conversion circuits 2 and 3 are of −1 polarity. The orthogonal BPSK waves 31 and 32 are then added together at an adder 8 which in turn produces a QPSK modulated wave 33. In the above operation, the carrier 36 is on/off controlled using a carrier on/off signal 34 so that the QPSK wave 33 has the form of a burst-like modulated wave. The carrier on/off signal 34 may be obtained from the frame formatting circuit 1 or alternatively may be supplied externally. The carrier on/off signal 34 is delayed by a predetermined time interval $\tau$ at a delay circuit 9 so as to be converted into a delayed carrier on/off signal 35 which acts to on/off control a carrier on/off switch 11. The predetermined delay time $\tau$ is so determined as to permit the carrier on/off signal 34 to synchronize with the frame head and frame trail of the burst-like modulated wave, so that the delay circuit 9 can provide the carriers 29 and 30, which are switched on and off, with the same time lag as a time lag by which the I and Q binary data signals are delayed before they reach the double balanced mixers 6 and 7.

Referring now particularly to FIG. 2, the exemplary frame format of the burst-like modulated wave will be described. One frame has a plurality of burst-like modulated waves between which a guard time interval is provided. Each burst-like modulated wave is comprised of a preamble portion and a data portion and the preamble portion is comprised of a carrier recovery code (CR code), a timing recovery code (STR code) and a code word. To explain behavior of the burst-like modulated wave at its head with reference to FIG. 3, when the delayed carrier on/off signal 35 assumes on state at the CR head of the bit pattern 23 or 24 to switch on the carrier, the QPSK wave 33 as represented by its envelope is known to rise abruptly as illustrated in FIG. 3 at the instant that the carrier is switched on. Similarly, to explain behavior of the burst-like modulated wave at its trail with reference to FIG. 4, the QPSK wave 33 is known to fall abruptly at the instant that the carrier is switched off. The envelope components of the modulated wave change abruptly in this manner, causing a modulated wave spectrum to spread, as shown in FIG. 5, beyond its band having a center carrier frequency $f_c$ and a symbol time width Ts. More particularly, the abrupt envelope change leads to spreads of the spectrum as indicated by hatched areas which interfere with adjacent channels.

To determine the maximum (worst) amount of the interference due to the abrupt envelope change, a model as shown in FIG. 6 is considered. In this model, the burst-like modulated wave is assumed to be of a fixed code during an interval of N.Ts (N being constant integer). This fixed code has a spectrum amplitude A which is indicated in terms of the base band by the following expression:

$$A = \left| \frac{2\sin(\pi f \cdot NT s)}{2\pi f} \right|, \tag{1}$$

indicating that the amplitude A changes with frequency f as graphically illustrated in FIG. 7.

Exemplarily, at f=1/Ts+1/(4NTs), the amount of the interference with adjacent channels is determined, for a sufficiently large N, from equation (1) as follows:

$$Ts \frac{\sin \frac{\pi}{4}}{\pi} \approx 0.23 TS \qquad (2)$$

Since the DC component of an NRZ pulse having a width Ts and a height of 1 (one) has an energy level of $Ts^2$, the amount of the interference pursuant to equation (2) may be halved at the head and trail of the burst-like wave with the halved amount measuring a maximum of about −20 dB.

As described previously, in the conventional modulator shown in FIG. 1, the carrier rises and falls abruptly at the head and trail of the QPSK wave. Consequently, pulse-like noises appear in the adjacent channels due to the abrupt rise and fall of the carrier. One possible way to cope with this disadvantage may be such that the carrier level is controlled without changing the shape of the band limited spectrum. But this method would require that the envelope change unnecessarily extremely gradually over several symbols, inviting a decrease in transmission efficiency. A preferable countermeasure must satisfy the requirement that the envelope can change as abruptly as possible under less interference with the adjacent channels. It is to be noted that in the foregoing example the signal power level of the channel in question subject to the carrier on/off switching is assumed to be equal to that of the adjacent channels but obviously the higher the signal level of the channel in question relative to that of the adjacent channels, the more the amount of the interference increases.

FIG. 8 illustrates a known modulator which is intended to suppress the spread of the spectrum while permitting the abrupt rise and fall of the burst-like modulated wave. A modulator similar to the FIG. 8 modulator is disclosed in, for example, JP-B 63-4981 (published May 16, 1983).

The operation of the FIG. 8 modulator will now be described by making reference to waveforms illustrated in FIG. 9. In FIG. 8, reference characters a and b designate codes to be transmitted, c a first carrier on/off signal, d a second carrier on/off signal, 150 a local oscillator, 154 and 157 low-pass filters adapted to perform band limitation of the transmission codes, 151 a mixing circuitry, and 152, 153 and 156 switches. FIG. 9 illustrates at section (A) the transmission codes a and b each of which assumes "0" level or "1" level. Illustrated at section (B) in FIG. 9 is the first carrier on/off signal by which the switches 153 and 156 are turned off with its "0" level and turned on with its "1" level. FIG. 9 illustrates at (C) output waveforms of the low-pass filters 154 and 157, demonstrating that the on/off operation of the switches 153 and 156 causes the low-pass filters to undergo transient phenomena in the vicinity of on/off timing of the switches 153 and 156. FIG. 9 illustrates at (D) the output signal of the mixer 151, that is, a waveform (modulated waveform) of the carrier which is modulated with the output signals of the low-pass filters 154 and 157. Illustrated at (E) in FIG. 9 is the second carrier on/off signal by which the switch 152 is turned off or on with its "0" level or "1" level. FIG. 9 illustrates at (F) the output signal of the switch 152. In depicting the waveforms in FIG. 9, for clarity of explanation of the timing relation, time lags in the individual blocks are neglected. It is also noted that the transmission codes a and b actually take various bit patterns but these bit patterns are simply overlapped in the illustration at sections (A) and (C) in FIG. 9. The FIG. 8 modulator is disadvantageous in that two additional switches are needed as compared to the FIG. 1 modulator, that when the low-pass filters 154 and 157 are realized with digital circuits, the capacity of a ROM (Read Only Memory) used is increased imposing constraint on the hardware design, and that the guard time is lost by a time corresponding to one bit. To explain the second disadvantage specifically, the digital type low-pass filter is essentially comprised of a binary counter, a shift register, a ROM and a D/A converter and the transmission code (i.e. code to be transmitted) is first stored in the shift register. The ROM is precedently stored with sampled values of response waveforms by which the low-pass filter responds to various bit patterns of the transmission signal. The sampled values of the low-pass filter response waveforms corresponding to bit patterns stored in the shift register are then read out of the ROM sequentially as the value of the binary counter proceeds. The output signal from the ROM is converted by the D/A converter into an analog waveform. Generally, the digital low-pass filter is constructed in this manner. In applying this digital low-pass filter to the low-pass filter of FIG. 8, however, there is needed another shift register for storing the status of the first carrier on/off signal c and the ROM must be designed to store values corresponding to output signals of the additional shift register, leading to an increase in the capacity of the ROM. A low-pass filter structurally resembling the aforementioned digital type low-pass filter is disclosed in "C-2 ANALYSIS AND DESIGN OF A ROM SYNTHESIZER AS AN OPTIMUM DIGITAL TRANSMIT FILTER", pp 87–90, INTELSAT/-TECE/TTE Third International Conference on DIGITAL SATELTTE COMMUNICATIONS, Nov. 11–13, 1975, KYOTO, JAPAN (See FIG. 16 of this application to be described later). To specifically explain the third disadvantage of the FIG. 8 modulator, since t described at (A) in FIG. 9 represents one-bit time width, the guard time is lost by t(=t/2+t/2) as is clear from (F) in FIG. 9.

SUMMARY OF THE INVENTION

An object of this invention is to provide a modulator which can suitably be used in a multi-carrier/time division multiple access type communication system without causing extensive interference with the adjacent channels and degradation of transmission efficiency.

Another object of this invention is to provide a modulator which imposes less constraint on the hardware design.

Still another object of this invention is to provide a modulator which is simplified in circuit construction.

According to one aspect of the invention, to accomplish the above objects, polarities or senses of the transmission code (signal) which appear before and after either of on-timing and off-timing (i.e., before and after on-timing and before and after off-timing) of the carrier are inverted to each other by taking advantage of the fact that the envelope of the modulated wave appearing at carrier on/off timing is greatly dominated by the transmission code appearing before and after the carrier on/off timing.

Thus, each of two codes is so set at carrier on/off timing as to have polarities which are inverted to each other before and after either of carrier on-timing and carrier off-timing, whereby the envelope of the band-limited modulated wave can be made zero at the carrier on/off timing or near the carrier on/off timing. By utilizing the envelope change which occurs when the polarity of a code contained in the modulated wave switches from one polarity to another, the envelope is made to change so gradually as to spend Ts/2 to reach zero, thereby sufficiently suppressing the spread of spectrum due to the carrier on/off operation.

BRIEF DESCRIPTION OF THE DRAWINGS

FIG. 24 is a diagram illustrating waveforms useful to explain the operation of a modification of the FIG. 19 embodiment.

DESCRIPTION OF THE PREFERRED EMBODIMENTS

Figure 1:
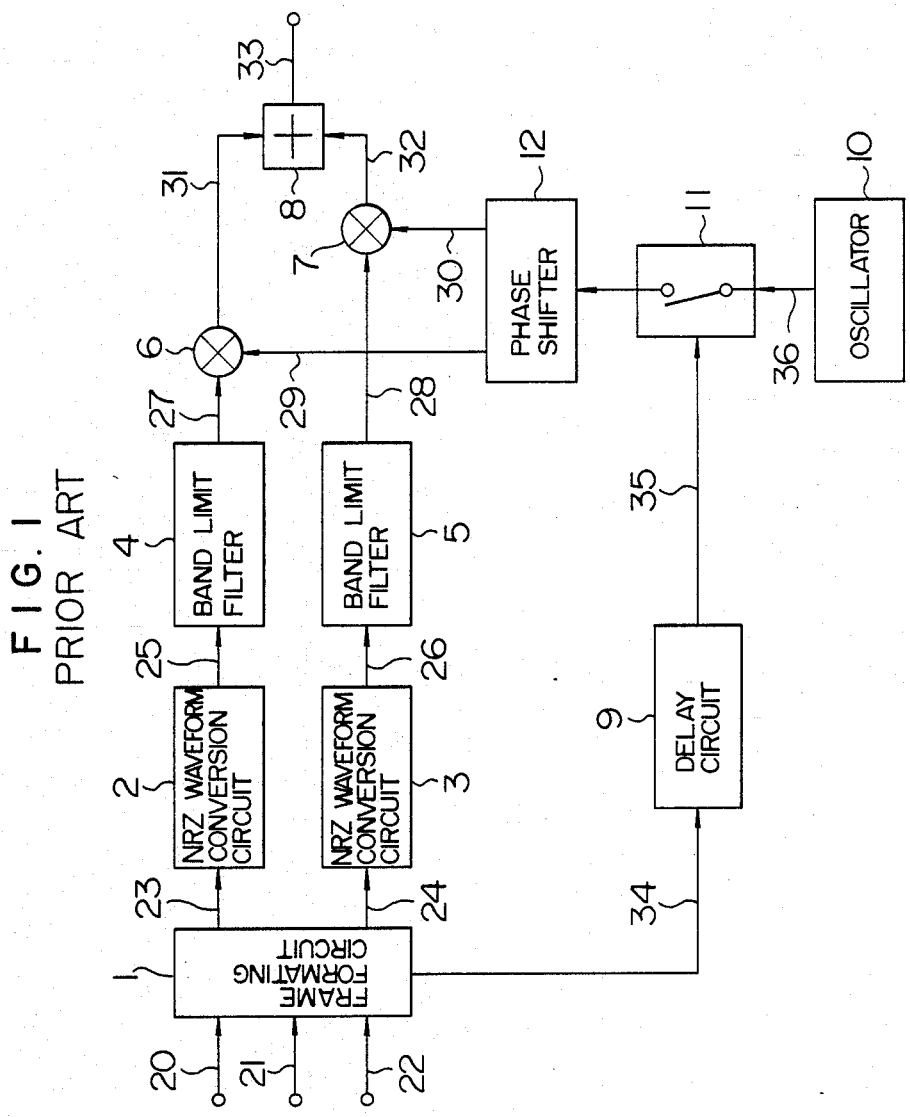
FIG. 1 is a schematic block diagram illustrating a prior art QPSK modulator.

The invention will now be described by way of example with reference to the accompanying drawings, particularly, FIGS. 10 to 24. Throughout the drawings, like components are designated by like reference characters and will not be described reiteratively unless necessary.

Before specifically describing the invention, the principle thereof will first be described with reference to FIGS. 11 and 12.

Figure 11:
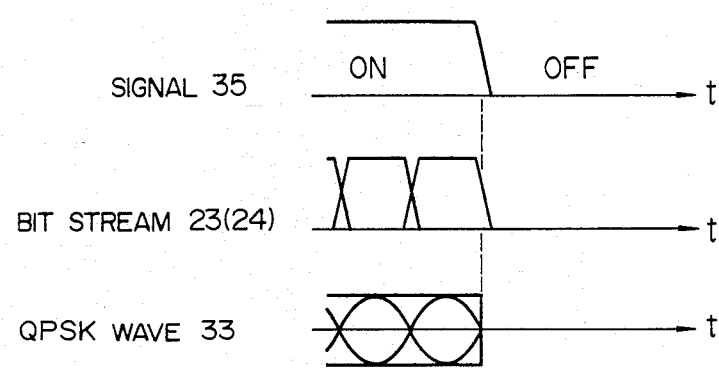
FIGS. 11 and 12 are diagrams for explaining the principle of the invention.
Figure 12:
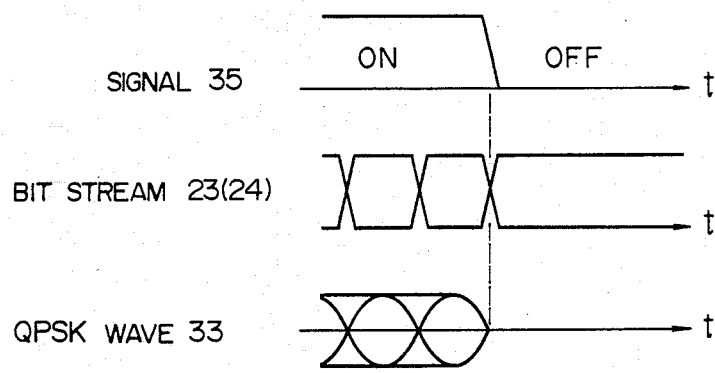

FIG. 11 shows an envelope of a modulated wave which appears at carrier off-timing when no constraint is imposed on a code before and after the carrier off-timing so that the code remains unchanged before and after the carrier off-timing. In such an instance, the envelope falls abruptly as best seen in FIG. 11. More specifically, when the "0" level of a bit pattern 23 (24) remains unchanged before and after the timing at which a carrier on/off signal 35 is turned off, the envelope of a QPSK modulated wave 33 falls abruptly, as illustrated in FIG. 11. On the other hand, FIG. 12 shows an instance where a code is so set after carrier off-timing as to have polarities which are inverted to each other before and after the carrier off-timing, with the result that the envelope can change necessarily gradually at the carrier off-timing. The envelope behaves similarly at carrier on-timing.

Figure 10:
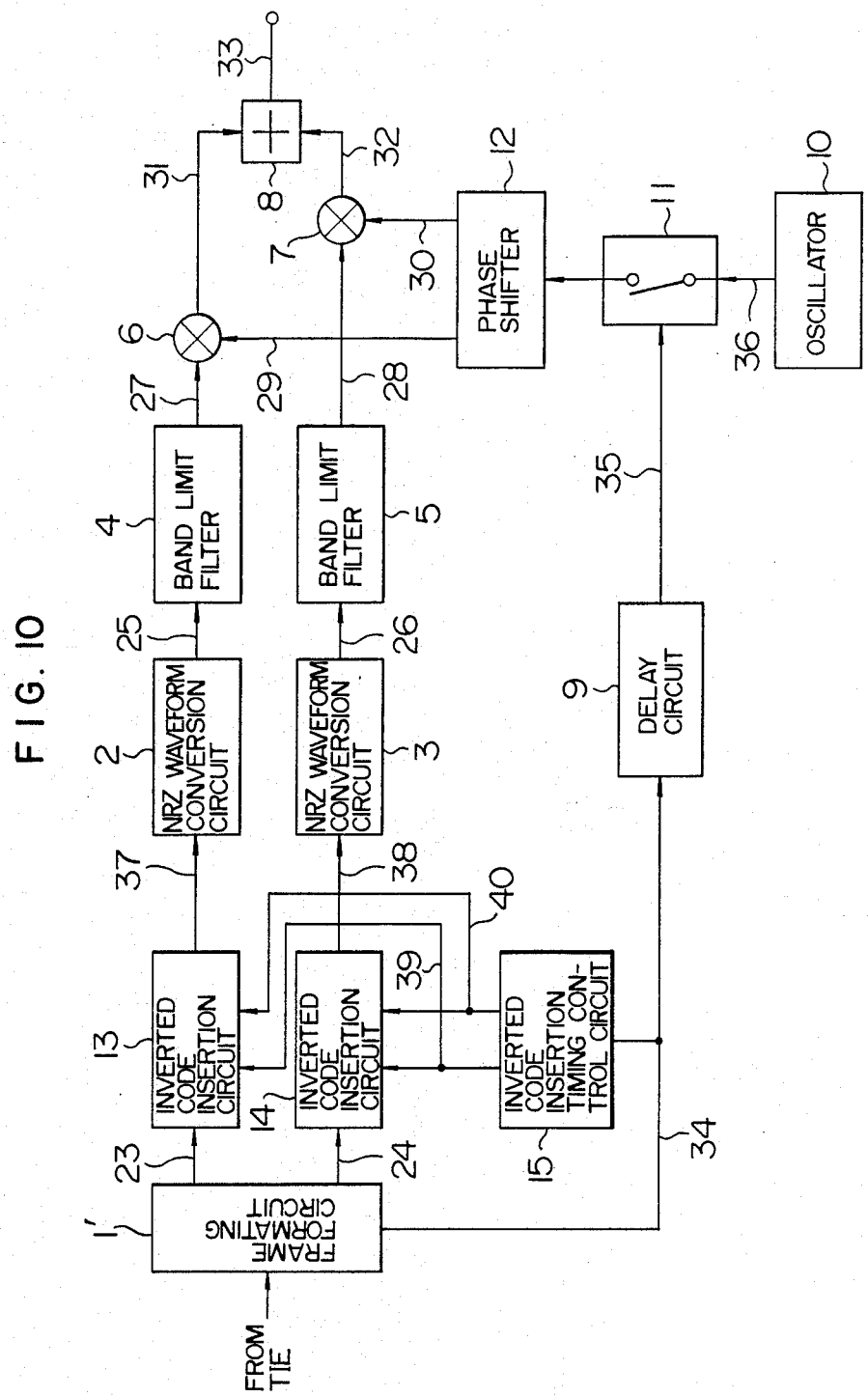
FIG. 10 is a schematic block diagram illustrating a QPSK modulator according to an embodiment of the invention.
Figure 13:
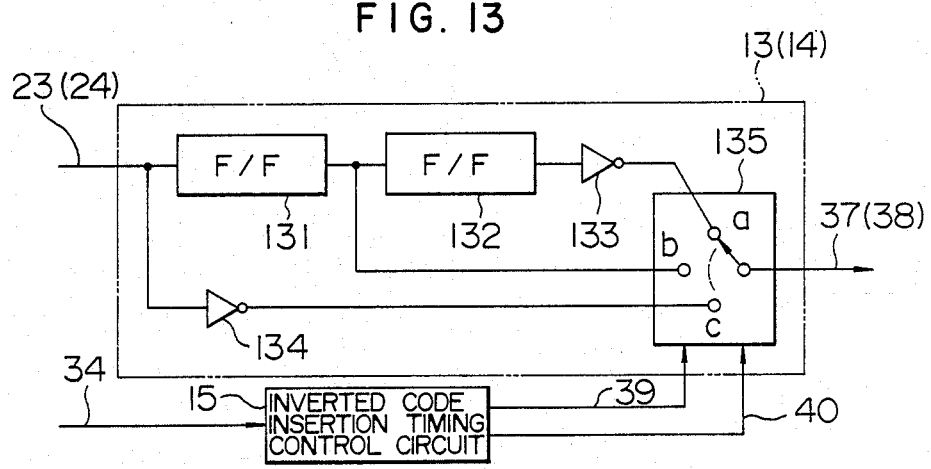
FIG. 13 is a fragmentary block diagram illustrating, as an example, the construction of an essential part of the FIG. 10 modulator.

Referring to FIG. 10, there is illustrated the overall construction of a QPSK modulator according to an embodiment of the invention which incorporates an essential part whose circuit configuration is exemplarily illustrated in FIG. 13. The FIG. 10 modulator of the invention is identical to the FIG. 1 modulator with the only exception that inverted code insertion circuits 13 and 14, an inverted code insertion timing control circuit are newly added and the frame formatting circuit is slightly modified. The newly added circuits constitute a circuit for mutually inversely setting polarities of a code before and after the carrier on/off timing which is commanded by the carrier on/off signal. The inverted code insertion circuits 13 and 14 are constructed identically as specifically illustrated in FIG. 13. In the inverted code insertion circuit, at the carrier on/off timing, a code having inverted polarities is prepared from a binary I bit stream 23 or binary Q bit stream 24 and the thus prepared inverted code is inserted, at a predetermined position, into the original binary I bit stream 23 or binary Q bit stream 24. A binary I bit stream 37 inserted with the inverted code or a binary Q bit stream 38 inserted with the inverted code is applied to the NRZ waveform conversion circuit 2 or 3.

Additionally, 1' denotes a frame formatting circuit. Based on a transmission data signal inputted from a terrestrial interface equipment (TIE) not shown, the circuit 1' outputs the binary I data string 23, binary Q data string 24, carrier on/off signal 34.

To particularly describe the inverted code insertion circuit 13 by making reference to FIG. 13, the binary I bit stream 23 is one bit delayed at either of a flip-flop 131 and a flip-flop 132 and is then passed through an inverter 133 so as to be selectively delivered out through a switch 135. On the other hand, output signals of the flip-flop 131 and an inverter 134 can also be delivered out selectively through the switch 135. Thus, given that a binary I bit stream output signal of the flip-flop 131 is used as the time reference or base, a binary I bit stream output signal which one bit precedes is inverted and delivered out of the inverter 133 and a binary I bit stream output signal which one bit succeeds is inverted and delivered out of the inverter 134. The switch 135 selectively delivers one of the three types of binary I bit streams under the control of the inverted code insertion timing control circuit 15.

Figure 14:
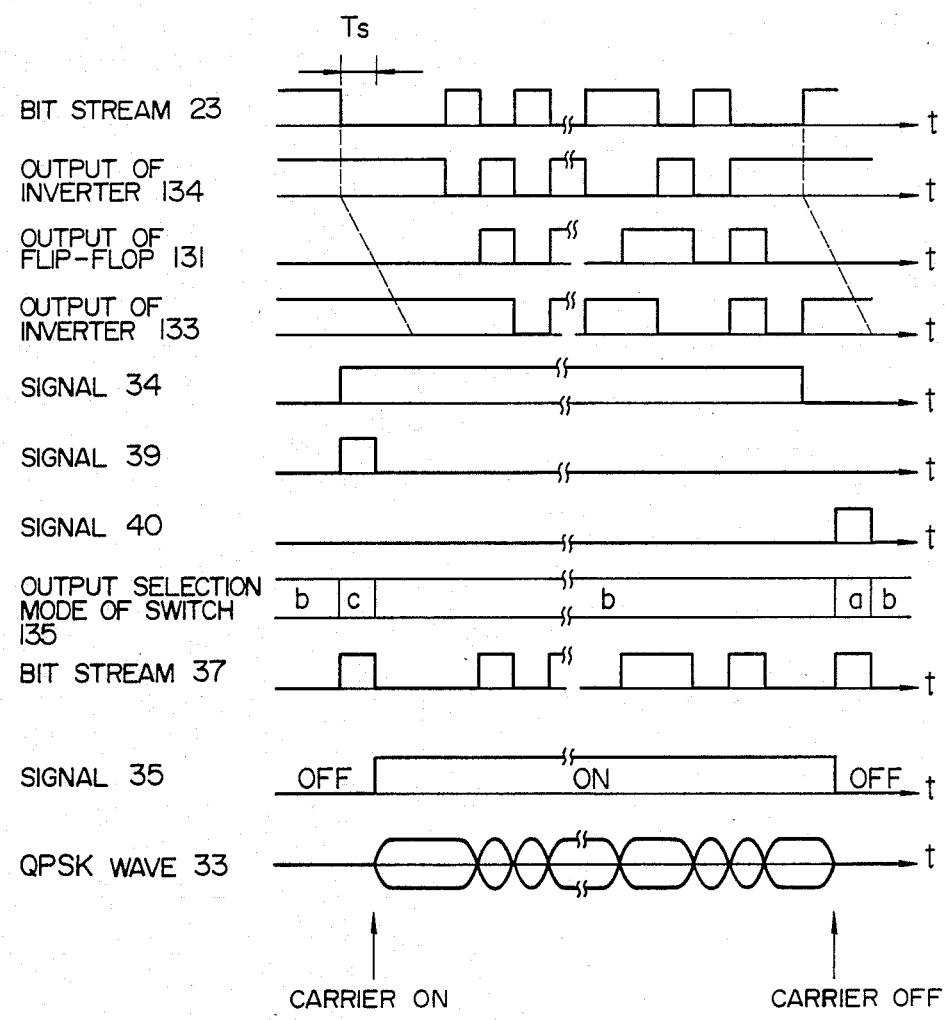
FIG. 14 is a diagram illustrating waveforms useful to explain the operation of the FIG. 10 embodiment.

FIG. 14 illustrates input/output signal waveforms in connection with the FIG. 10 modulator and its essential part shown in FIG. 13. Referring to FIG. 14, the inverted code insertion timing control circuit 15 responds to the carrier on/off signal 34 to produce an insertion timing control signal 39 in synchronism with the rise of the signal 34 and an insertion timing control signal 40 in synchronism with the fall of the delayed carrier on-off signal 35. Since the switch 135 is set by the insertion timing control signals 39 and 40 to operate in the selective output modes as indicated in FIG. 14, the inverted code insertion binary I bit stream 37 can be obtained as shown in FIG. 14. The above operation for the binary I bit stream 23 can similarly be applied to the binary Q bit stream 24 and eventually the QPSK wave 33 can necessarily gradually change over Ts/2 as is clear from FIG. 14. The time relation between the bit stream 23 and the output signal of each of the flip-flop 131 and inverter 133 is represented by the dashed line in FIG. 14, indicating that with respect to the bit stream 23, the output signal of flip-flop 131 is 1 Ts delayed and the output signal of inverter 133 is 2 Ts delayed.

Figure 15:
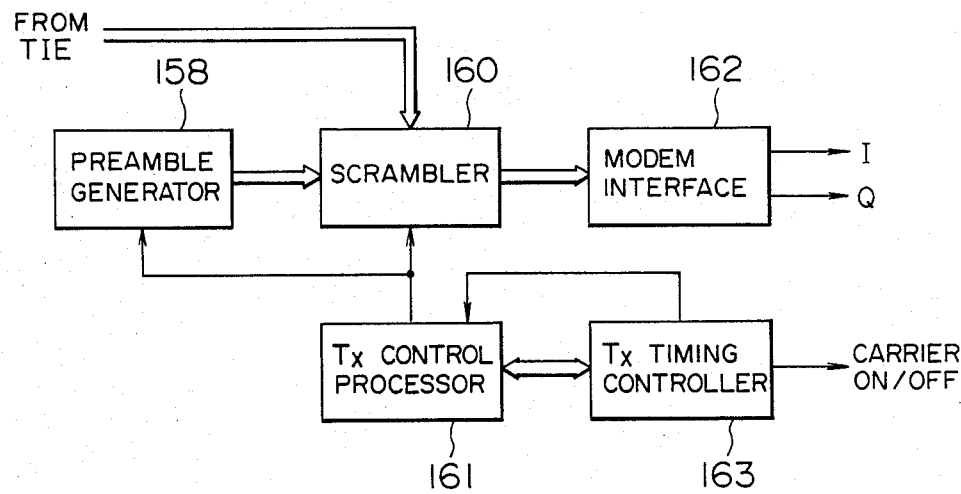
FIGS. 15 and 16 are fragmentary block diagrams illustrating exemplary constructions of portions of the FIG. 10 embodiment.

FIG. 15 illustrates, in block form, an example of the frame formatting circuit 1' used in the FIG. 10 modulator. A similar circuit to the FIG. 15 circuit is disclosed in, for example, "DIGITAL COMMUNICATIONS SATELLITE/EARTH STATION ENGINEERING", pp 368-369, by Dr. Kamilo Feher, PRENTICE HALL INC., 1981.

Figure 2:
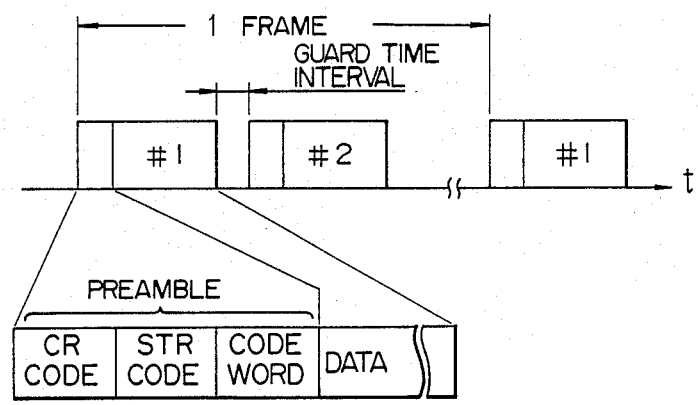
FIG. 2 is a diagram showing a frame format of a burst-like modulated wave.
Figure 3:
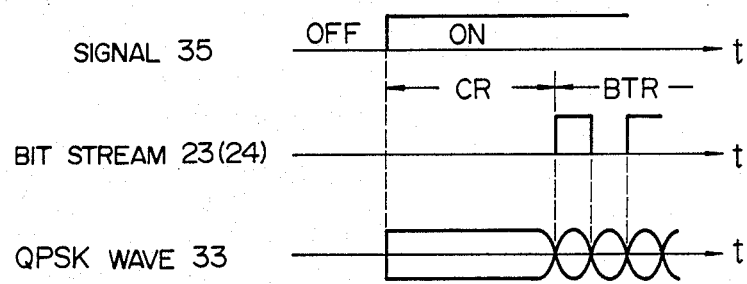
FIG. 3 illustrates behavior of the FIG. 2 burst-like modulated wave at its head.
Figure 4:
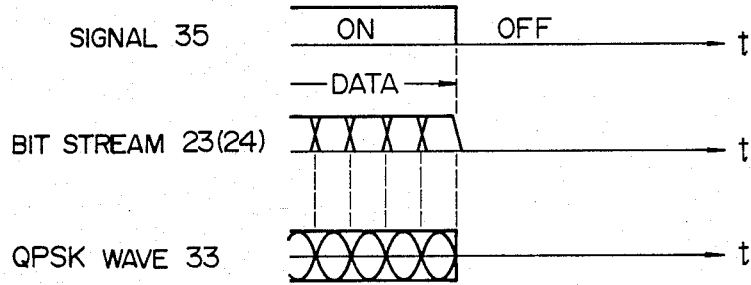
FIG. 4 illustrates behavior of the FIG. 2 burst-like modulated wave at its trail.
Figure 5:
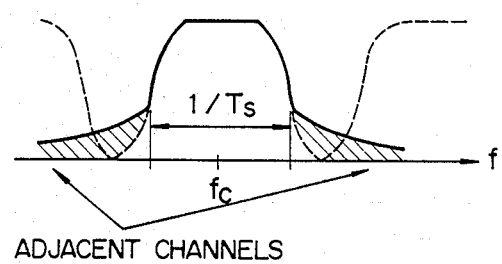
FIG. 5 is a diagram useful in explaining the spread of modulated-wave spectrum due to the modulated-wave envelope component.
Figure 6:
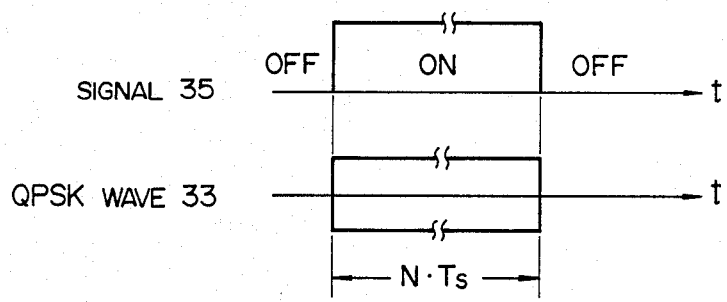
FIGS. 6 and 7 are diagrams for explaining the theoretically determined amount of interference with adjacent channels caused when the modulated-wave envelope changes.
Figure 7:
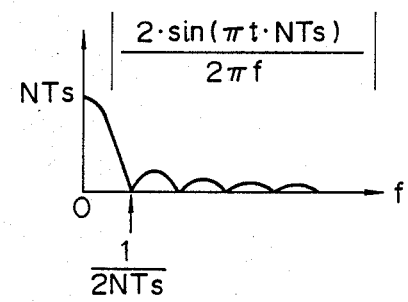
Figure 8:
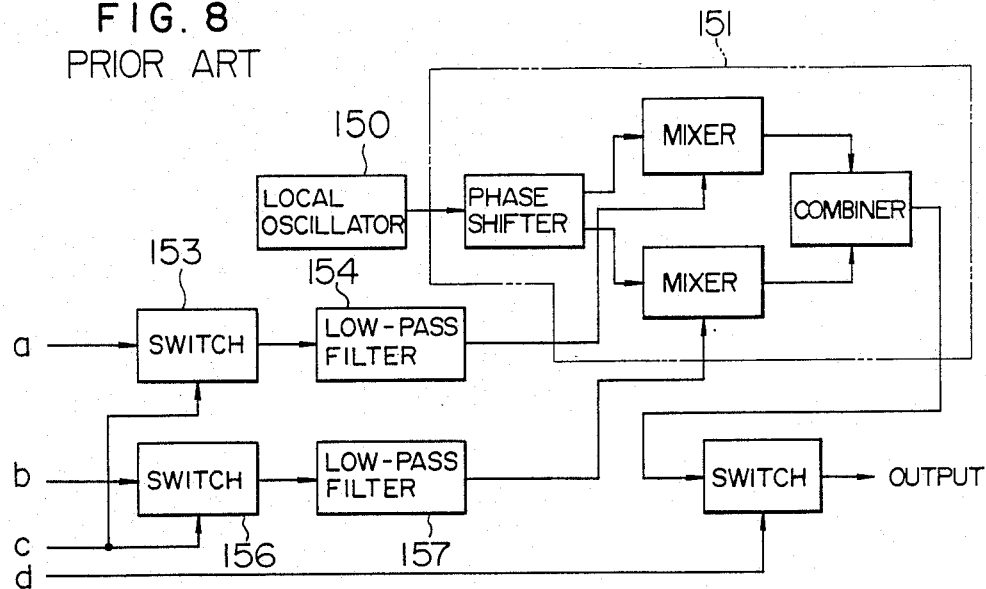
FIG. 8 is a schematic block diagram illustrating another prior art QPSK modulator.
Figure 9:
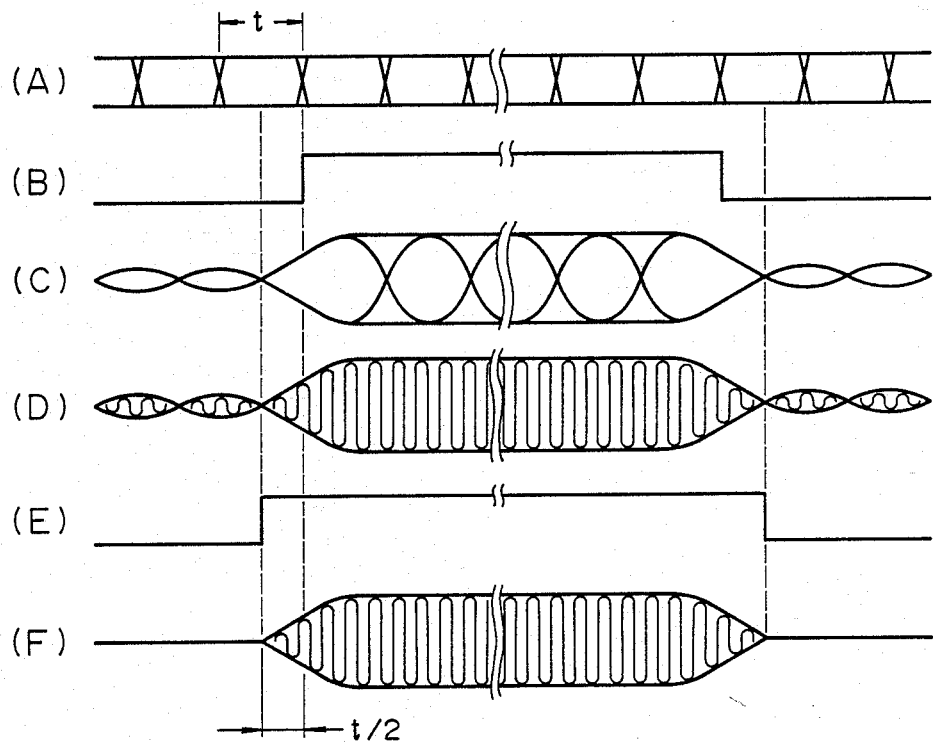
FIG. 9 illustrates at sections (A) through (F) waveforms useful to explain the operation of the FIG. 8 modulator.

Referring to FIG. 15, the preamble portion shown in FIG. 2 is generated from a preamble generator 158. For example, this preamble generator may be realized using a ROM (not shown) in which predetermined patterns are written and from which the stored patterns are sequentially read. On the other hand, a transmission data signal sent from the TIE and the output signal of the preamble generator are both supplied to a scrambler 160 where they are combined together under the control of a transmission (Tx) control processor 161. The scrambler 160 does not scramble the preamble but scrambles only the transmission data signal. An output signal of the scrambler 160 is applied to a modem interface 162 which in turn produces binary I and Q bit streams that are converted into, for example, a QPSK modulated wave by means of the modulator. The modem interface 162 also produces, in addition to the I and Q bit streams, the timing signal and carrier on/off signal. A transmission (Tx) timing controller 163 controls the operation timing of the Tx control processor.

Figure 16:
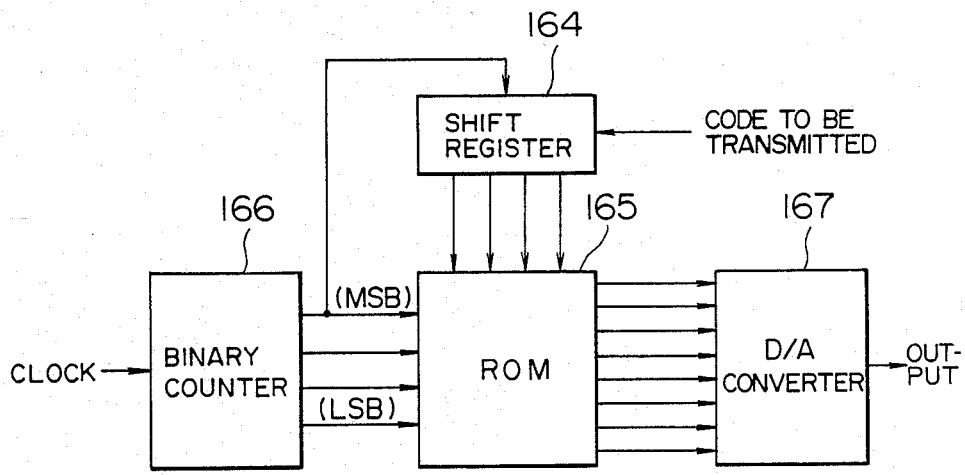

FIG. 16 illustrates, in block form, an example of a circuit which includes the band limit filter 4, 5 and NRZ waveform conversion circuits 2, 3 used in the FIG. 10 modulator. A similar circuit is disclosed in, for example, the previously-described literature "C-2 ANALYSIS AND DESIGN OF A ROM SYNTHESIZER AS AN OPTIMUM DIGITAL TRANSMIT FILTER".

Referring to FIG. 16, a code to be transmitted is stored in a shift register 164. Sampled values of response waveforms by which the low-pass filter responds to various bit patterns of the transmission code are precedently written in a ROM 165. The sampled values of the low-pass filter response waveforms corresponding to bit patterns stored in the shift register 164 are then read out of the ROM 165 sequentially as the count of a binary counter 166 proceeds. The output signal of the ROM 165 is converted by a D/A converter 167 into an analog waveform. The function of the NRZ waveform conversion circuits 2, 3 shown in FIG. 10 is realized by the D/A converter 167 shown in FIG. 16. More specifically, assuming that the NRZ waveform conversion circuits 2, 3 operate to convert the logical value "0", "1" of the code to be transmitted to −1 Volt and +1 Volt, respectively, this function is realized by properly setting the DC offset voltage and gain of the D/A converter 167 shown in FIG. 16. The band limit filter is not limited by the above type. For example, the band limit filter as well as the mixers and the adder is digitized by using a technology disclosed in U.S. Patent application Ser. No. 15,014 filed Feb. 17, 1987 under the name of the assignee of the present application and now U.S. Pat. No. 4,756,008.

While the invention has been described in connection with the foregoing embodiment as applied to the QPSK modulation system, it is not limited thereto and in general, may be applicable to an n-order PSK modulation system. Further, the invention may also be applied to an offset type QPSK modulation system and a BPSK modulation system.

Figure 17:
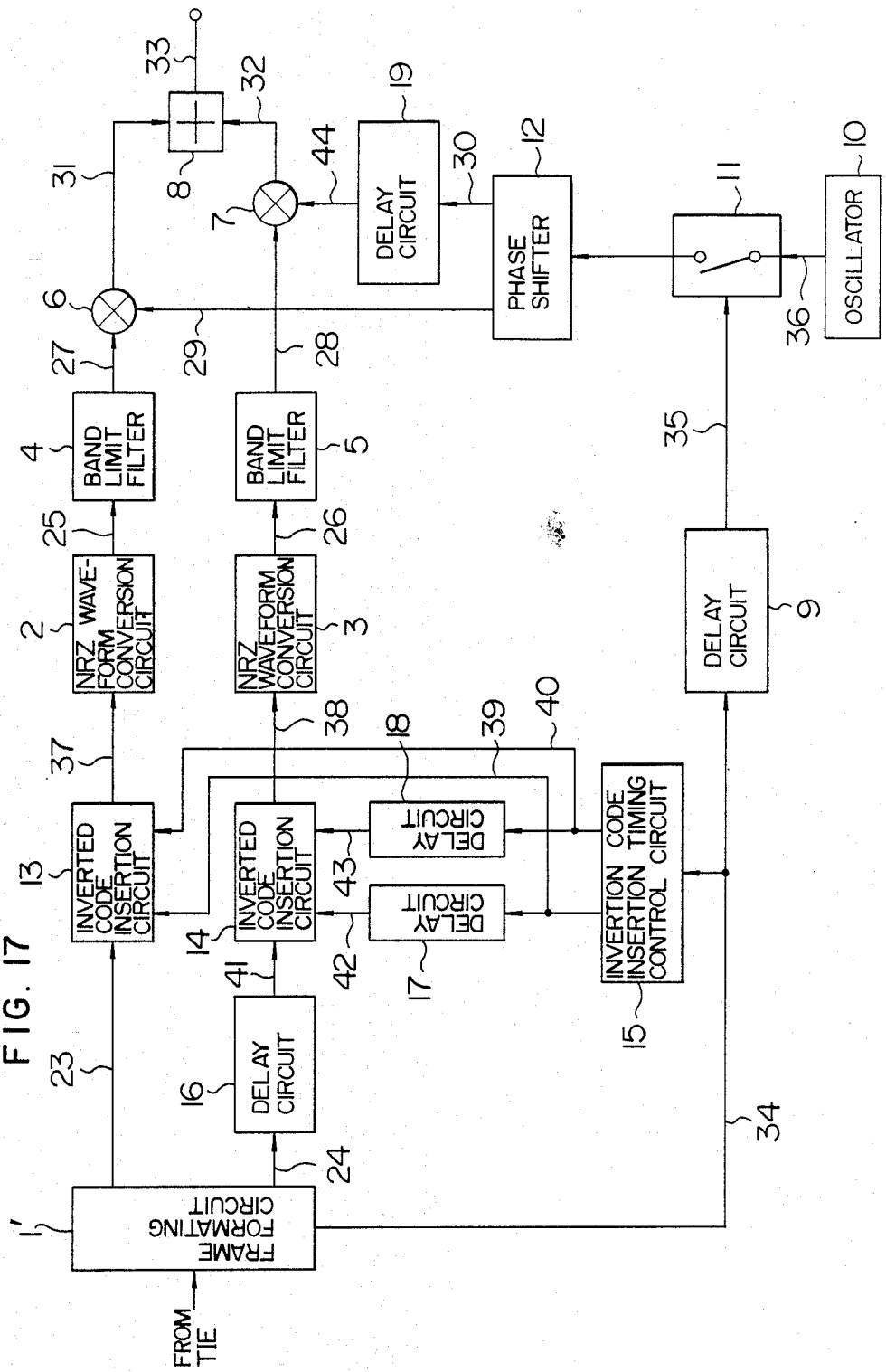
FIG. 17 is a schematic block diagram illustrating an embodiment of an offset type QPSK modulator according to the invention.
Figure 18:
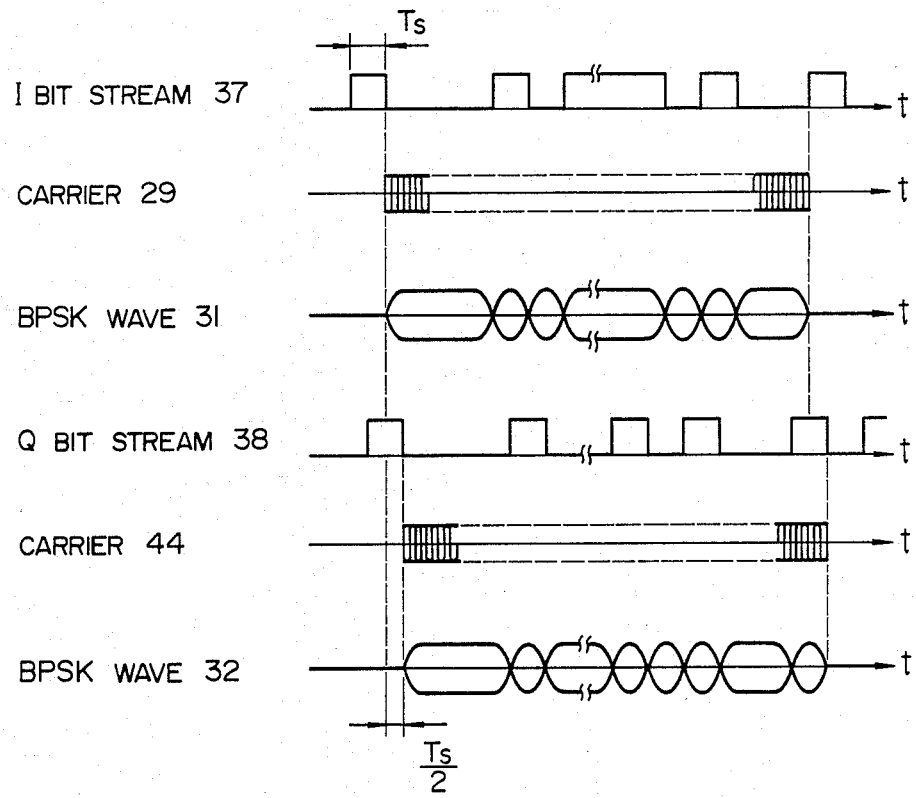
FIG. 18 is a diagram illustrating waveforms useful to explain the operation of the FIG. 17 embodiment.

FIG. 17 is a schematic block diagram illustrating an embodiment of a modulator applied to the offset type QPSK modulation system in accordance with the invention. Referring to FIG. 17, the embodiment of FIG. 17 essentially differs from the FIG. 10 modulator in that delay circuits 16 to 19 for Ts/2 time lag are newly added. The delay circuit 16 shifts the binary Q bit stream 24 by Ts/2 so that an output signal 41 of the delay circuit 16 is Ts/2 offset with respect to the binary I bit stream 23. Similarly, the delay circuits 17 and 18 are adapted to Ts/2 delay, with respect to the Ts/2 offset binary Q bit stream 41, the code insertion timing control signals 39 and 40 during the carrier on/off operation, respectively, so that a delayed insertion timing control signal 42 of the delay circuit 17 and a delayed insertion timing control signal 43 of the delay circuit 18 are applied to the inverted code insertion circuit 14. These delayed insertion timing control signals 42 and 43 provide timings for inserting into the binary Q bit stream 24 inverted codes during the carrier on and off operations, respectively. For the same reason, the carrier subject to the on/off operation has to be Ts/2 delayed and accordingly a delayed carrier 44 delivered out of the delay circuit 19 is supplied to the double balanced mixer 7. The carrier on/off operation in the offset type QPSK modulation system is diagrammatically illustrated in FIG. 18. Since the Q bit stream 38 is Ts/2 offset relative to the I bit stream 37, the envelope of the BPSK wave 31 appears at the head of the burst-like offset QPSK modulated wave and the envelope of the BPSK wave 32 appears at the trail, both of the envelopes changing gradually.

Figure 19:
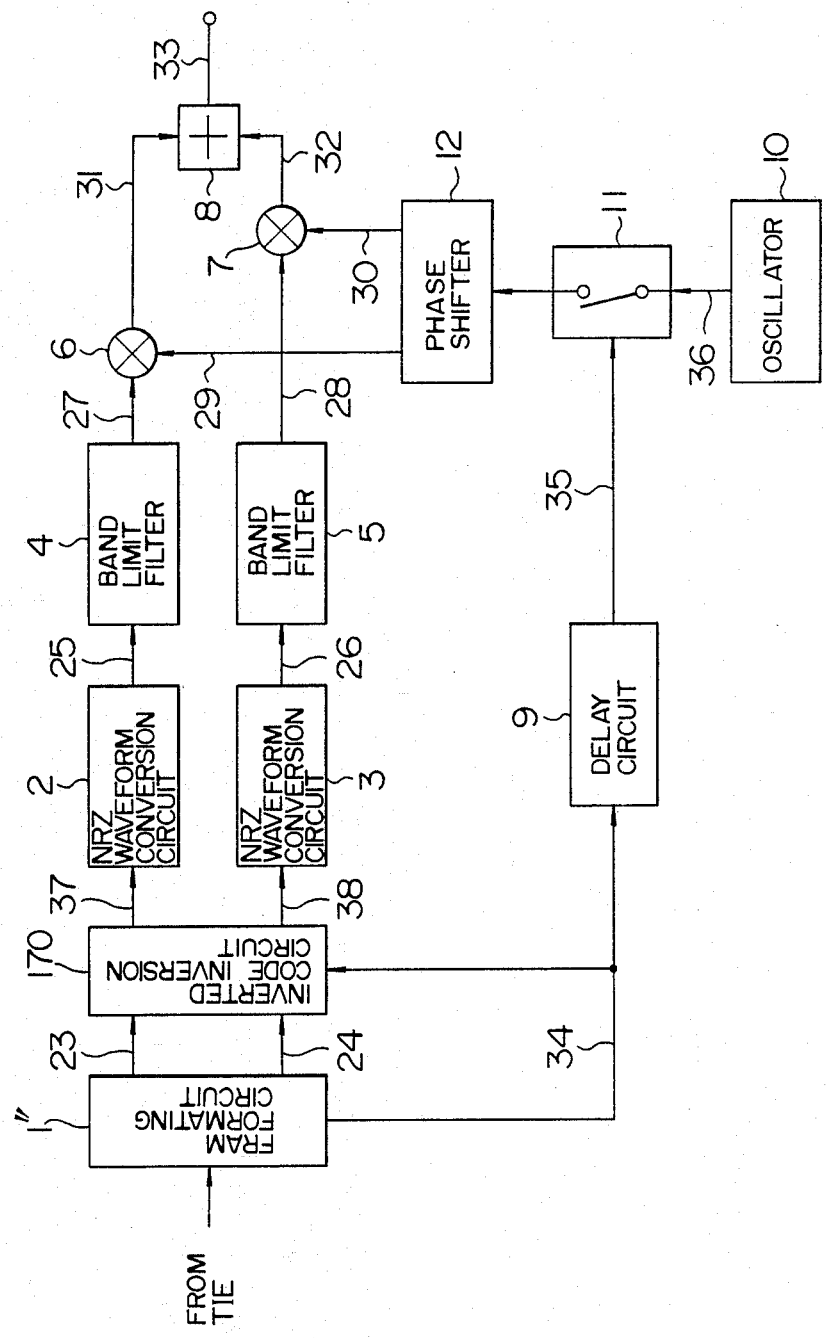
FIG. 19 is a schematic block diagram illustrating a QPSK modulator according to another embodiment of the invention.

FIG. 19 illustrates, in block form, a modulator according to another embodiment of the invention. Structurally, the FIG. 19 embodiment is identical to the FIG. 10 embodiment with the exception that an inverted code insertion circuit 170 is interposed between a frame formatting circuit 1" and NRZ waveform conversion circuits 2, 3 so as to be directly operated by the carrier on/off signal 34 and that the frame formatting circuit 1" is differently constructed from the frame formatting circuit 1'.

Figure 20:
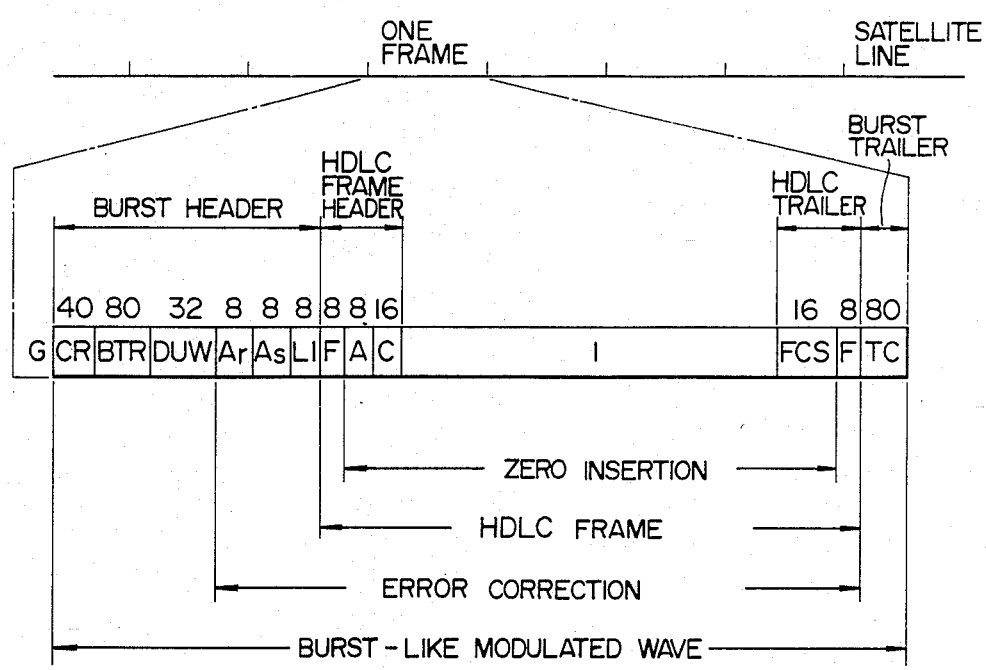
FIG. 20 illustrates an example of a frame format of burst-like modulated wave used in the FIG. 19 embodiment.

The embodiment of FIG. 19 is applicable to the burst-like modulated wave having a frame format as shown in FIG. 20.

The frame format of burst-like modulated wave shown in FIG. 20 is reported in a paragraph "SUMMARY OF THE SYSTEM" of "EXPERIMENTAL SYSTEM FOR COMPUTER NETWORK VIA SATELLITE (CS)", REVIEW OF THE RADIO RESEARCH LABORATORIES, Vol. 28, No. 145, March '82, pp 31-38. As illustrated in FIG. 20, the frame format has a carrier re-transmission sequence CR of 40 bits at the head of the burst-like modulated wave and a trailing carrier TC of 80 bits at the burst-like modulated wave trail. The carrier re-transmission sequence CR and trailing carrier TC are desirably selected to have a code of either "1" or "0".

An example of the construction of the frame formatting circuit 1" for generating the frame format of burst-like modulated wave shown in FIG. 20 will now be described by referring to FIG. 21.

Figure 21:
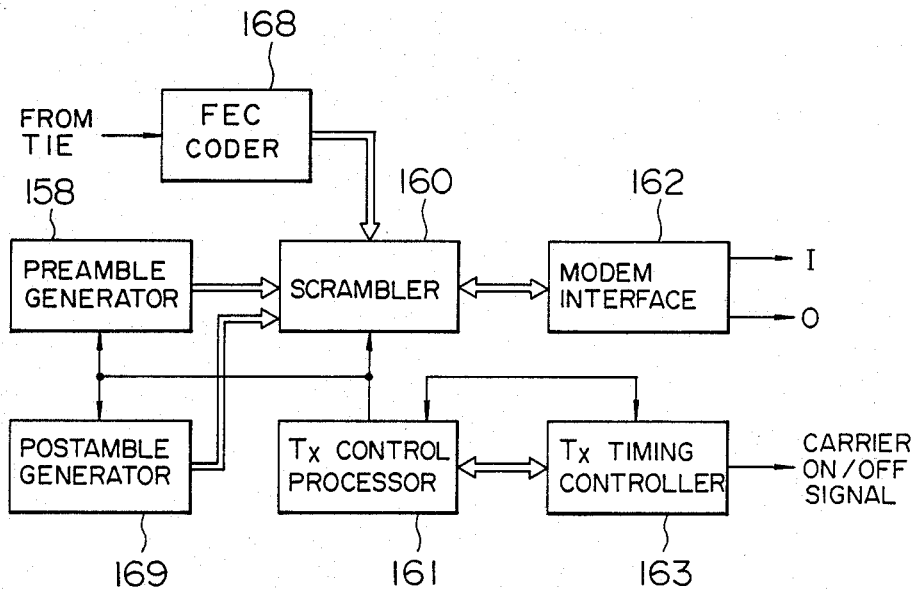
FIGS. 21 to 23 are fragmentary circuit diagrams illustrating exemplary constructions of portions of the FIG. 19 embodiment.

The frame formatting circuit 1" is specifically exemplified in a block diagram of FIG. 21, having an FEC coder 168 and a postamble generator 169 which are additionally provided in comparison with the FIG. 15 frame formatting circuit 1'. The postamble generator 169 is adapted to add to the burst-like modulated wave trail a predetermined code called "postamble" like the preamble and is operated, like the preamble generator of FIG. 15, to supply the postamble to the scrambler 160 under the control of the Tx control processor 161. The transmission data signal from the TIE is converted by the FEC coder 168 into an error correction code for forward error correction. Output signals of the FEC coder, preamble generator and postamble generator are all inputted to the scrambler 160 and combined together under the control of the Tx control processor 161. Excepting the above, the operation of the FIG. 21 circuit resembles that of the FIG. 15 circuit and will not be described herein.

Figure 22:
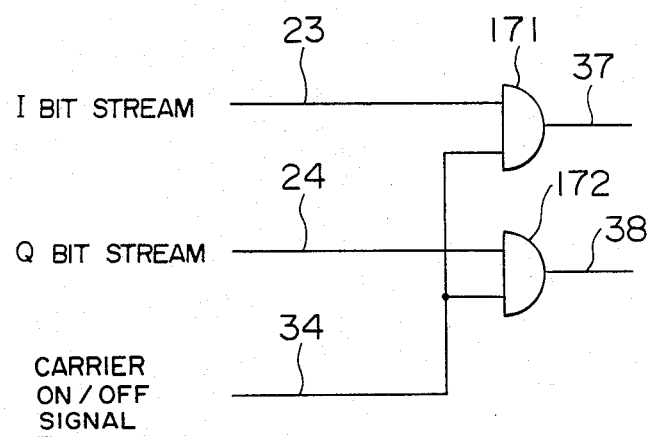

The operation of the FIG. 19 modulator will now be described with reference to FIGS. 19, 22 and 23. The inverted code insertion circuit 170 of the FIG. 19 modulator is purposely exemplified as illustrated in either FIG. 22 or FIG. 23. Particularly, in an instance where the CR and TC in FIG. 20 are selected to be of "1" code, each of the transmission I and Q bit streams 23 and 24 is ANDed with the carrier on/off signal 34 as illustrated in the FIG. 22 circuit in order to make "0" the bits preceding the CR and succeeding the TC. In FIG. 22, reference numerals 171 and 172 designate AND gates and the carrier on/off signal assumes "1" for turning on the carrier and "0" for turning it off. In an instance where the CR and TC ar selected to be of "0" code, each of the transmission I and Q bit streams is ORed, by means of OR gates 173 and 174, with the carrier on/off signal which is inverted by means of an inverter 175.

Figure 23:
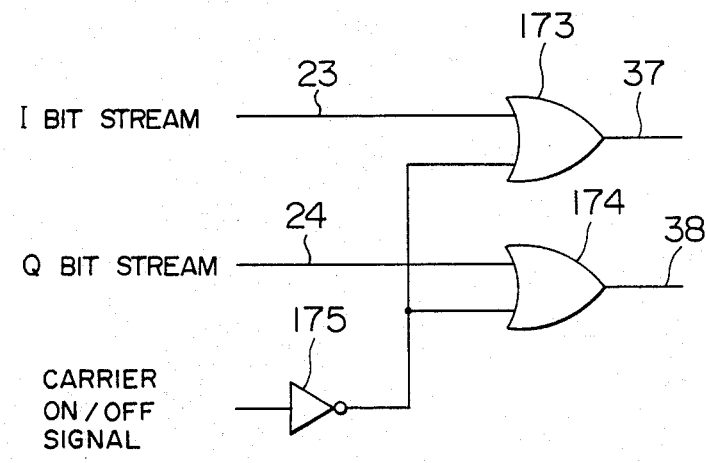

As described above, when the burst-like modulated wave has predetermined bit patterns (CR and TC in FIG. 20) at its head and trail, the bit preceding the carrier on-timing and the bit succeeding the carrier off-timing can be manipulated through the simplified logical operation as shown in FIGS. 22 or 23.

Without resort to the circuit of FIGS. 22 or 23, the preamble generator 158 and postamble generator 169 may also be used to manipulate the bit preceding the carrier on-timing and the bit following the carrier off-timing, respectively. For example, in such modification, the preamble generator 158 and postamble generator 169 may be realized with a ROM which is addressed from the Tx control processor 161 in such a manner that the written content of the ROM corresponding to the bits preceding the carrier on-timing and the written content of the ROM corresponding to the bits succeeding the carrier off-timing are such that they are in inverse relation to the bit after the carrier on-timing and the bit before the carrier off-timing, respectively. The Tx control processor may then be constructed so as to transfer the preamble generator output signal appearing at least one bit before the carrier on-timing to the modem interface 162 without scrambling the same output signal and transfer the postamble generator output signal appearing at at least one bit after the carrier off-timing to the modem interface 162 without scrambling the same output signal.

FIG. 24 is a timing chart showing the operation of the aforementioned modification, given that the CR at the head of the burst-like modulated wave and the TC at the trail thereof are both of "1" code. As is clear from FIG. 24, by precedently generating the bits preceding and succeeding the carrier on-timing and off-timing from the preamble generator 158 and postamble generator 169, respectively, the envelope of the modulated wave can rise necessarily gradually at the carrier on-timing and fall necessarily gradually at the carrier off-timing.

As has been described, according to the invention, the spread of the modulated wave spectrum can be suppressed with ease and without degrading the transmission efficiency in order to reduce the interference of the modulated wave spectrum with the adjacent channels in the multi-carrier type transmission system.

We claim:

1. A modulator for generating a burst-like modulated wave used in a multi-carrier transmission type communication system in which a plurality of modulated waves including at least one burst-like modulated wave exist on the same transmission line and the frequency band occupied by energy of each of said plurality of modulated waves is limited, said modulator comprising:
   formatting means responsive to a digital data signal to be transmitted to generate a bit stream formatted in accordance with a predetermined frame format;
   means connected to said formatting means, for converting said bit stream into a band limited base band signal;
   means for generating a carrier;
   means connected to said converting means and said carrier generating means, for mixing said carrier with said base band signal;
   means connected to said carrier generating means and responsive to a carrier on/off signal, for controlling timings for supply and supply-stop of said carrier to said mixing means; and
   means connected between said formatting means and said converting means, for so setting polarities of transmission code signals, which appear before and after either of supply timing and supply-stop timing of said carrier to said mixing means, as to be inverted to each other.

2. A modulator according to claim 1 wherein said polarity setting means comprises a first flip-flop for receiving said bit stream, a second flip-flop connected to the output of said first flip-flop, a first inverter connected to the output of said second flip-flop, a second inverter for receiving said bit stream, and switching means responsive to said carrier on/off signal, for selecting any one of output signals of said first flip-flop and first and second inverters.

3. A modulator according to claim 1 wherein said burst-like modulated wave has bit patterns of a predetermined logical value at its head and trail, and said polarity setting means has means responsive to said carrier on/off signal to so set polarities of the transmission code signals, which appear before and after either of supply timing and supply-stop timing of said carrier, as to be inverted relative to the polarity of said bit patterns of predetermined logical value.

4. A modulator according to claim 1 wherein said converting means has second converting means for converting said bit stream into said base band signal, and a low-pass filter connected to the output of said second converting means to receive said base band signal.

5. A modulator according to claim 1 wherein said polarity setting means comprises means for storing a first bit code set of at least one bit code immediately preceding the supply timing of said carrier and a second bit code set of at least one bit code immediately succeeding the supply-stop timing of said carrier, and means for reading the content of said storing means at timing which at least one bit precedes said supply timing and at timing which at least one bit succeeds said supply-stop timing, said first bit code set having a polarity inverse to that of the transmission code signal which appears immediately after said supply timing and said second bit code set having a polarity inverse to that of the transmission code which appears immediately before said supply-stop timing.

* * * * *